United States Patent [19]

Kaufmann

[11] 4,420,224
[45] Dec. 13, 1983

[54] LIQUID CRYSTAL DISPLAY CELL, PROCESS FOR ITS PRODUCTION AND CELL PLATE

[75] Inventor: Meinolph Kaufmann, Fislisbach, Switzerland

[73] Assignee: BBC Brown, Boveri & Company Limited, Baden, Switzerland

[21] Appl. No.: 212,710

[22] PCT Filed: Mar. 6, 1980

[86] PCT No.: PCT/CH80/00034
§ 371 Date: Nov. 10, 1980
§ 102(e) Date: Nov. 10, 1980

[87] PCT Pub. No.: WO80/01959
PCT Pub. Date: Sep. 18, 1980

[30] Foreign Application Priority Data

Mar. 8, 1979 [CH] Switzerland .......................... 2232/79

[51] Int. Cl.³ .................. G02F 1/133; G02B 1/10; B05D 5/06; C08K 7/06
[52] U.S. Cl. .................. 350/338; 106/287.34; 106/291; 350/320; 427/162; 427/167
[58] Field of Search .......... 350/320, 336, 338, 339 R, 350/339 D; 428/149, 325, 331, 630, 632; 65/60.8; 106/287.34, 291; 427/123, 162, 167; 252/512

[56] References Cited

U.S. PATENT DOCUMENTS

| | | | |
|---|---|---|---|
| 2,803,566 | 8/1957 | Smith-Johannsen | 106/287.34 |
| 2,941,894 | 6/1960 | McAdow | 106/291 |
| 3,932,026 | 1/1976 | Sprokel | 350/339 R |
| 3,988,494 | 10/1976 | McAdow | 428/328 |
| 4,213,676 | 7/1980 | Kaufmann | 350/388 |

FOREIGN PATENT DOCUMENTS

| | | | |
|---|---|---|---|
| 2639675 | 2/1978 | Fed. Rep. of Germany . | |
| 319559 | 12/1971 | U.S.S.R. | 427/123 |
| 323382 | 11/1972 | U.S.S.R. | 252/512 |

*Primary Examiner*—William H. Punter
*Attorney, Agent, or Firm*—Oblon, Fisher, Spivak, McClelland & Maier

[57] ABSTRACT

A fluid crystal display cell (1) which has 2 cell plates coated with electrodes (14, 15) which include a fluid crystal mass (5). The first cell plate (1) is transparent and the second cell plate (2) is equipped with an adhesive cell interior reflector layer (9), at least in some regions, which contain the flake-like aluminum particles (6) as reflector particles and a bonding phase for this. The bonding phase is a practically homogeneous, transparent layered mineral matrix (7), consisting almost primarily of SiO₂, in which the aluminum particles (6) are imbedded.

9 Claims, 2 Drawing Figures

LIQUID CRYSTAL DISPLAY CELL, PROCESS FOR ITS PRODUCTION AND CELL PLATE

FIELD OF THE INVENTION

The invention concerns a liquid crystal display cell, hereinafter abbreviated as an LC-cell, which has two cell plates coated with electrodes including a liquid crystal mass; at least the first cell plate is transparent and the second cell plate is equipped, at least in some parts, with an adhesive cell interior reflector layer which contains flake-like aluminum particles as reflector particles and a bond for these. The invention concerns also a process for the production of such LC-cells as well as a plate for use in such cells.

DESCRIPTION OF THE PRIOR ART

Certain types of LC-cells (also known as LC-displays or LCD's) require a layer at least in part reflecting the light falling upon it, for example a more or less reflective layer, which is positioned above the electrode coating on the interior side of the cell as a so-called interior reflector and, for example, is applied by means of vaporization.

In order to exclude certain disadvantages of the common, that is vaporized interior reflectors of LC-cells with regard to operating and production costs, it is already known, for example from the DE-OS 26 39 675 and 27 16 609 of the applicant, that the interior reflector layer should be formed essentially of a variety of metal plates or flakes, especially of an aluminum pigment or "aluminum bronze", i.e., flake-like aluminum particles.

For this a paste-like mixture, which contains the aluminum particles and a temporary bonding agent, can be applied on the surface to be structured with the interior reflector of the corresponding cell plate, for example by means of screen printing. According to the afore-mentioned DE-OS 26 39 675, glass soldering powder can be added to the mixture which acts as a continuous bonding agent, i.e., as a bonding phase, after being burned in. According to the afore-mentioned DE-OS 27 16 609, however, it is possible to use only a temporary bonding agent in the mixture and to remove this practically without any residues after being burned in. The external aluminum oxide coating, which is formed almost spontaenously on the flake-like aluminum particles by means of atmospheric oxygen or produced specifically by a special treatment acts as a bonding phase and an electrical insulator in both cases which is supposed to prevent an electrical bridging of separated electrode areas of the LC-cell plates having an interior reflector.

The use of glass solder in the mixture used for the production of the interior reflector is problematic for a number of reasons and, in any event, does not provide optimal and sufficient thin interior reflector layers in the technical production stage of LC-cells which probably is a result of the relatively high strength of the glass solder in a melted state and/or of the insufficient homogeneity of the mixture.

The interior reflectors, formed practically only from metallic aluminum flakes and their oxide external layers, in accordance with DE-OS 27 16 609 can be shaped with sufficient thinness but have the disadvantage that the vertical orientation, which is either desirable or necessary for many types of LC-cells as can be achieved by the application of a silane layer on the interior surface of a cell plate, is practically not possible on the interior reflector because this has an uneven surface.

Even the well-known mechanical friction of the interior surface of the cell plates, that causes a parallel orientation of the fluid crystal molecules and is required for some types of LC-cells, cannot be performed on the familiar interior reflector layers because these are not wipe-resistant or not sufficiently well-fixed enough on the cell plate.

Finally, an interior reflector layer consisting practically only of surface oxidized aluminum flakes has the disadvantage of insufficient mutual electrical insulation of the flakes in some instances, especially if the layer is burned in at temperatures between 400° and 500° C. and/or if the electrode regions or segments of the plates bearing the interior reflectors have separator zones of less than 50 μm.

SUMMARY OF THE INVENTION

An object of this invention is to provide an LC-display cell of the afore-mentioned type in which the reflector layer adheres solidly to the cell plate, is sufficiently thin and wipe-resistant and the flake-like aluminum particles are insulated electrically from each other with sufficient mass. Another object of this invention is to provide a process for the production of an LC-display cell with the aforementioned properties.

These and other objects have been achieved by providing a practically homogeneous, transparent and layer-like matrix consisting largely of $SiO_2$, in which the aluminum pigmet particles are imbedded, serving as a bonding phase for the aluminum pigment particles of the reflector layer in the LC-display cell. The reflector layer usually has a medium thickness of 0.3 to 5 μm, preferably of 0.5 to 1 μm, and consists preferably of $SiO_2$ constituting at least 20% of its weight and the remainder consists practically totally of the scale-like aluminum particles.

Surprisingly it was found that such a reflector layer can be obtained in a simple and inexpensive fashion by the fact that a fluid, organic orthosilicate with the formula

is added at normal temperature to a pre-mixture or to the mixture used for applying the aluminum particles to the corresponding cell plates, in which $R^1$, $R^2$, $R^3$, and $R^4$ are the same or different organic remainders, preferably alkyl remainders with 1 to 4 carbon atoms each, especially ethyl remainders which are evanescent in the form of the corresponding hydroxyl compounds (i.e., as $R^1OH$, $R^2OH$, $R^3OH$ and $R^4OH$) (boiling point of a maximum of 150° C.); the organic orthosilicate is hydrolisized before, during or after the application of the mixture, which occurs generally in the acidolytic fashion, i.e., in the presence of an acid. For best results, a volatile mineral acid, such as concentrated hydrochloric acid, is used and is added to the mixture or to the pre-mixture. The hydrolysis and, particularly, the preferred acidolysis occurs at room temperature or at moderately higher temperatures (up to around 120° C.) spontaneously and leads to the formation of silicic acid which can consist totally or partially of orthosilicic acid; as a result of the subsequent annealment (heating to 300° to 550° C., preferably 430° to 470° C.), the silicic acid is practically totally dehydrated to SiO$_2$.

In this way there results a reflector layer adhering rigidly to the cell plate, the thickness of which can be set in the desired range of 0.3 to 5 µm by the thickness of the applied layer and the composition of the layer.

Preferably, the mixture applied as a layer also contains a temporary bonding agent in order to facilitate layer formation on the basis of the known pressure process, such as screen printing. Such a temporary bonding agent, usually an organic thickener in an organic solution, is supposed to be removed without any residues upon subsequent annealment. Silk screen process bonding agents, which correspond to this requirement, are readily available on the market, for example viscous solutions of thermally unstable polymers such as nitrocellulose, in organic solvents such as amyl acetate. Such mixtures are best of all dried on the plate at temperatures of 80° to 150° C. after being pressed on and prior to the subsequent annealment.

Suitable organic orthosilicates of the afore-mentioned compound of formula (I) are technically available, such as e.g., the preferred ethyl silicate Si(OC$_2$H$_5$) or can be obtained by using an essentially familiar procedure such as the reaction of ROH+SiX$_4$→Si(OR)$_4$ whereby R stands for $R^1$, $R^2$, $R^3$, or $R^4$ and X is a halogen, in particular chlorine.

Because the organic orthosilicates (formula I) used in accordance with the invention are fluid at normal temperature, they can be distributed homogeneously, without any difficulties, in the fluid external phase of the mixture with the flake-like aluminum particles, especially if the external phase contains a temporary bonding agent of the afore-mentioned type.

By means of hydrolysis and dehydration there results a layered matrix, consisting primarily and, preferably, practically only of SiO$_2$, which is practically homogeneous and transparent, from the compound (I) corresponding to the reaction scheme

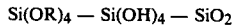

Si(OR)$_4$ — Si(OH)$_4$ — SiO$_2$ and in which the aluminum particles are imbedded.

The aluminum particles are flaked, i.e., they have very small thicknesses in relationship to the largest particle diameters, e.g., in the size class of 0.1 µm, and the largest particle diameters are in the size class of 1 to 10 µm. Normally, such particles orient themselves essentially parallel to the plate surface in a fresh mixture applied on the cell plate.

It should be noted here that the formation of SiO$_2$ layers produced by vaporization is common in semiconductor technology and also for LC-display cells. Regardless of the fact that the vaporization process is a comparatively complicated operation, this method is not at all suitable for the formation of an imbedded SiO$_2$ matrix as the bonding phase for aluminum particles, at least not within the framework of a technical production process. On the other hand, e.g., the usage of anorganic dilutable silicates as proposed in DE-OS 15 19 311 for the formation of SiO$_2$ as an application mass on the basis of metal pigment cannot be used for the production of interior reflectors of LC-cells for various reasons: in the formation of SiO$_2$ from dilutable anorganic silicates such as water glass, dilutable salts form such as, for example, according to the scheme

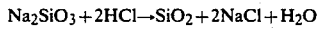

Na$_2$SiO$_3$+2HCl→SiO$_2$+2NaCl+H$_2$O which cannot be removed thermally and make impossible the formation of a practically homogeneous imbedding matrix made of SiO$_2$. Furthermore, this method requires a diluted system and is not suitable for the formation of thin layers.

In connection with dye masses on the basis of metal or aluminum pigment, furthermore, the use of organic silane compounds of the formula R-si(OR)$_3$ is proposed in DE-OS 26 30 731 as an additive (R=alkyl) which leads to the formation of organic silizium polymers, namely organosiloxanes, which protect the pigment. But organosiloxanes are well known for their thermal resistance and the residue-free thermal removal of the organic portions from the layers formed in this way is practically not possible, i.e., a transparent and practically homogeneous imbedding of the aluminum particles in an anorganic matrix cannot be achieved in this way.

BRIEF DESCRIPTION OF THE DRAWINGS

Below the invention is explained by means of FIGS. 1 and 2, wherein.

DETAILED DESCRIPTION OF THE PREFERRED EMBODIMENTS

Figure 1:
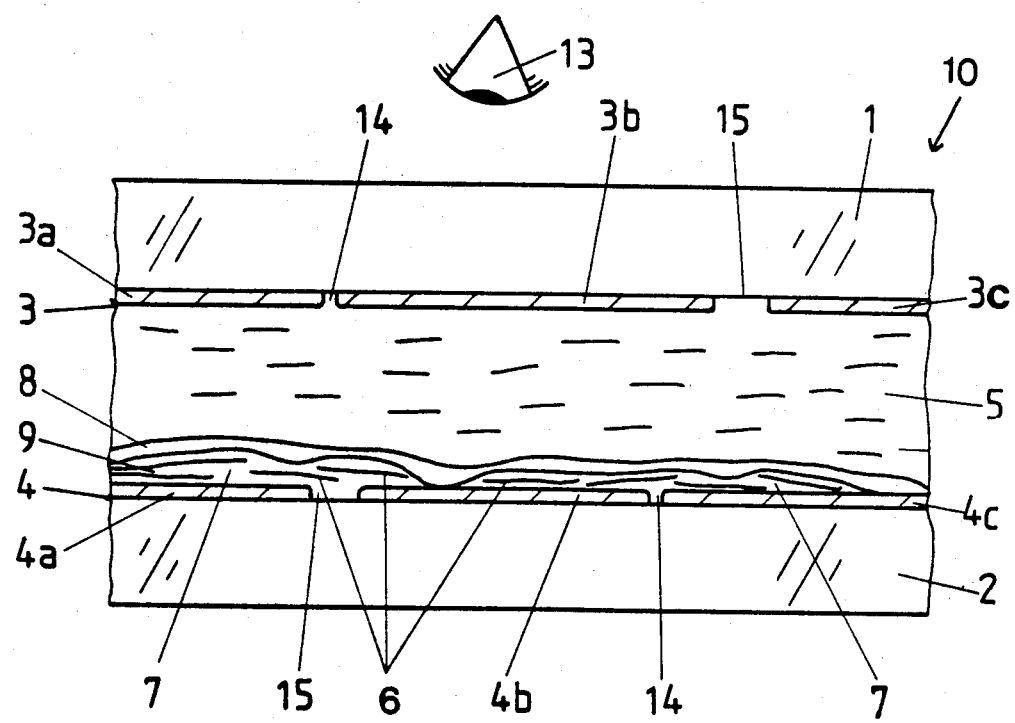
FIG. 1 is a schematic and enlarged cross sectional view of a liquid crystal cell as proposed by the invention with an interior reflector.

In the depiction of an LC-cell (10) of FIG. 1 the common marginal areas as well as the electrical wires are omitted for the purposes of simplification.

The LC-cell (10) is composed of two cell plates (1, 2) which are coated in a common fashion with electrode layers (3, 4). Each of the electrode layers (3,4) consists of numerous segments (e.g., 3a, 3b, 3c and 4a, 4b, 4c) with separation zones between them (14, 15). The separation zones (15) are, e.g., relatively wide (>50 µm) whereas the separation zones (14) are formed narrowly (<50 µm). In the case of such narrow separation zones, certain problems appear when known reflector layers are used and are discussed in more detail below.

A common LC-mass (5), i.e., the dielectrical medium of the display cell appears as a layer with a thickness of, e.g., 5 to 10 µm between the cell plates (1,2) and on the edges is included tightly into the cell (10) in an essentially familiar fashion by a distancing element (not shown).

In the case of a cell functioning, for example, on the basis of the so-called "Guest/Host" principle (see, e.g., T. J. Scheffer, J. Appl. Phys. 24/1973/4799), the LC-mass (5) has a light absorbing, screw-shaped molecular orientation in the field-free state which can be converted into a light non-absorbing or minimal light absorbing, equi-shaped molecular orientation upon establishing an electrical field between the electrodes (3 and 4). The LC-cell (10) depicted in FIG. 1 is activated for this in reflection and is exposed to light from the front. Similarly on the front side there is the observer (13). The light emitted to the LC-cell (10) is allowed through in the region of the non-absorbing, equal shaped molecular orientation of the LC-layer (5), is reflected or scattered at the reflector layer (9) and is reflected by the transparent electrodes (3) as well as the similarly transparent cell plate (1) back to the observer (13).

Suitable LC-masses for the layer (5) for operations on the basis of the "Guest/host" principle are familiar and consist, e.g., of a nematic basic substance with positive dielectrical anisotropy such as a mixture made of p-butoxy-, p-hexyloxy- and p-octanoyloxybenyzlides-p-aminobenzonitril, 5 to 15% of an optically active substance, e.g., cholesterylbenzoate and 0.2 to 1% pleochroitic dye.

As is essentially known, e.g., from U.S. Pat. Nos. 3,854,794 and 3,973,057, a layer (8), e.g., made of a well known silane for this purpose, is applied on the reflector layer (9) in order to orient the LC-molecule vertically to the border surface. The use of a vertically orienting layer (8), however, is not essential to the discovery but rather is preferred only for certain usage purposes. Alternatively, the reflector layer can also be rubbed in accordance, e.g., with the method known from Mol. Cryst. and Liqu. Cryst. 23(1973) 187 ff. in order to effect a parallel molecular orientation of the LC-molecules to the border areas.

It should be stressed that the discover's LC-cells can be used also for other types of operations than for the "Guest/Host" cells with corresponding, essentially familiar modifications with respect to the LC-mass; e.g., as twisted nematic cells of the type described in DE-OS 24 22 509 which require only a polarizer (not depicted in FIG. 1).

But esssential to the invention for all types of operations of the LC-cell (10) is the structure of the reflector layer (9) which, in accordance with the invention, has a practically homogeneous, transparent and layered matrix (7) consisting at least primarily-preferably, practically completely-of $SiO_2$ in which the flake-like aluminum particles or leaves (6) are imbedded as reflector particles.

Preferably, an interior reflector layer (9) having a maximum thickness of 5 $\mu$m is used in accordance with the invention which has a practically homogeneous imbedding matrix or external phase for the aluminum particles (6) as a bonding phase and is not composed essentially of discontinuous aluminum oxide with or without the glass solder which is practically unsuitable for the formation of thin reflector layers with homogeneous bonding phase as is the case for the reflector layer known from DE-OS 26 39 675 or 27 16 609.

Preferably, the practically homogeneous matrix (7) consists practically completely of $SiO_2$ which is formed by acid hydrolysis of at least one compound of formula (I) for the formation of silicic acid and subsequent dehydration by annealment, i.e., by heating up to 300° to 550° C. in a mixture with the reflector particles (6) on the plate (2).

But it is also within the framework of the invention to use corresponding compounds as well in addition to compounds of formula (I) in which the silicon atom is replaced by another tetravalent metal atom, e.g., the zirconium atom, in the compound of formula (I).

For most application purposes, however, the introduction of $ZrO_2$ or the like into the matrix (7) does not provide the advantages which could justify the greater efforts.

A practically homogeneous matrix or external phase (7) of the reflector layer (9) consisting essentially of $SiO_2$ provides considerable advantages for the LC-cells proposed by the discovery:

(1) It was found that the reflector particles (6) consisting of aluminum in the matrix (7) are isolated from each other and against each other with an electrical resistance of at least 10 megohms per quarter in a direction which is parallel to the electrodes (3,4).

For practical usage this means that very narrow separation zones (14) of less than 50 $\mu$m between the segments (4b, 4c) of the electrode layer (4) can be used without the danger of an electrical bridging of the separation zones (14) by the reflector particles (6). In the case of known reflector cells, such narrow separation zones are not possible.

(2) The cell interior surface of a practically homogeneous matrix (7) made of $SiO_2$ provides a sufficiently smooth structure in order to apply a layer, e.g., consisting of silane, easily and evenly to the border areas for an essentially familiar vertical orientation of the LC-molecules; even the adhesion of such a silane layer (8) to the surface of the matrix (7) is surprisingly good.

This is practically very relevant for the "Guest/Host" displays because with such an achieved vertical orientation, complete contrast effects can already be achieved at operating voltages of less than 10 volts. In the familiar reflector cells such orientation layers cannot be applied easily for which reason higher operating voltages are necessary.

(3) The adhesion of the $SiO_2$ matrix to the plate (2) or to their electrode layer (4) is excellent; this together with the fact of a solid and protective imbedding of the reflector particles (6) in the $SiO_2$ matrix (7) enables a mechanical surface processing of the interior reflector layer (9) without damage to its function.

This is of practical relevance for the afore-mentioned, essentially known process of rubbing for the parallel orientation of the LC-molecules to a border area between the free (e.g., not outfitted with a layer as in diagram 1) surfaces of the reflector layer (9) and of the LC-mass (5) because such an orientation is necessary for twisted nematic cells. The familiar reflector cells can not be rubbed.

(4) Reflector layers (9) with the reflector particles (6) imbedded in the $SiO_2$ matrix (7) can be produced with technical ease and inexpensively, e.g., by applying and thermally treating a mixture of the aluminum particles (6), which enables the formation of the layer, on the cell plate outfitted with the electrode coating (4) (e.g., by pressing them on). In principle, e.g., work can proceed along the silk screen methods outlined in DE-OS 26 39 675 and 27 16 609 if at least one compound of formula (I) and, preferably, an evanescent catalyst for the hydrolysis, e.g., hydrochloric acid, is mixed into the silk screen paste used for the production of the interior reflector layer prior to being pressed on.

(5) Another advantage of the $SiO_2$ matrix which is relevant for the production as well as for the properties of the LC-cell proposed by the invention is the finding that the aluminum diffusion pressure, which is already considerable at temperatures of about 400° C., and the concomitant metal diffusion in the $SiO_2$ matrix (7) do not cause any significant worsening of the electrical insulation of the aluminum particles (6). This practically means that work can be performed without disadvantages at annealment temperatures of over 400° C., preferably at 430° to 470° C., which results in more rapid production and less throw away in comparison with the present state of the art.

(6) The notable wipe resistance of the $SiO_2$ matrix (7) and of the interior reflector layer (9) of LC-cells as proposed by the invention as well as the plate, also belonging to the invention, with the adhesive reflector layer (9) generally facilitates the handling of the plates as well as the assembling of the LC-cells because the reflector layer is much less sensitive to mechanical defects than the less rub resistant and high grade scratch-resistant reflector layers in accordance with DE-OS 26 39 675 and 27 16 609.

Below, the process for the production of FC-display cells, which also belongs to the invention, is explained in more detail. Initially it should be mentioned that the steps known to the expert concerning the production of the cells, such as the coating of suitable cell plates with electrodes or electrode segments, the composition of the plates with seals on the edges, the selection and filling in of the LC-mass into the cell closed off up to the entry opening, the closing of the cell and the electrical joining of the cell are not discussed at this point. In this respect, reference is made to the relevant literature on the present state of the art; in particular, the production of LC-cell interior reflector layers on the basis of metal or aluminum pigment in DE-OS 27 16 609 is described as a result of the fact that at least in some areas, a layer made of a mixture or a silk screen paste (12), which contains flake-like aluminum particles, is applied and annealed on the rear cell plate (2) which is on the observer side of the finished cell and on its side outfitted with electrodes (4) or electrode segments (4a, 4b, 4c).

As in the case of the known process, the minimum temperature and the duration of the annealment in the present process as proposed by the invention are initially conditioned by the requirement that all evanescent portions of the mixture are reliably removed. In the process proposed by the invention there is an addition that the $SiO_2$ matrix (7) (diagram 1) has to be formed which is based on the thermal dehydration of silicic acid (in the "more monomer" form, i.e., as orthosilicic acid and/or in a more or less condensed form, i.e., as polysilicic acid) probably in the last stage. It is understood that the $SiO_2$ of the matrix is to be viewed as $(SiO_2)_n$. A clear identification and provision of the value of n, however, is usually not possible but practically also not necessary because primarily the afore-mentioned macroscopically ascertainable properties of transparence, homogeneity and rubbing and wiping strength are more important.

Familiar and technically available aluminum pigments or bronzes can be used as flake-like aluminum particles (6), the particles of which are flake-like or like small plates. Generally, the thickness of the particles is in the range of 0.05 to 0.5 $\mu$m, preferably at about 0.1 $\mu$m, and the mean surface dimensions of the particles are at least 10 times and preferably 50 to 200 times larger than their thickness. Dimensions of the aluminum particles (6) in the class of $10 \times 10 \times 0.1$ $\mu$m are suitable for many purposes of the invention. Special examples for suitable particles (6) are described, e.g., in "Pigment Handbood", Volume 1 (1973), 786–806 (edited by T. C. Patton).

The weight proportion of the aluminum particles to the mixture or the silk screen paste (12) applied to the plate (2) in accordance with diagram 2 is not particularly critical because this mixture normally contains evanescent parts which are removed prior to or during the formation of the finished reflector layer (9) (FIG. 1) by means of thermal treatment. An aluminum particle portion of the mixture of 1 to 20 percent of weight is suitable for many purposes.

The finished layer (9) can, for its part, contain more or less aluminum particles (6) depending upon whether a practically totally reflecting or only a partially reflecting layer (9) is desired. Partially reflecting layers (9) also belong to the invention and can be used, e.g. for transmissive mode LC-cells.

Generally, the finished layer (9) contains the aluminum particles (6) in a weight proportion of 5 to 90 percent, preferably 10 to 80% and in paricular 30 to 70% and the remaining part is practically only $SiO_2$.

In order to form the $SiO_2$ matrix (7) of the finished layer (9), at least a compound of the formula (I) is used for the formation of silicic acid in the mixture or silk screen paste (12), preferably tetraethyl silicate (Si-$(OC_2H_5)_4$), which is stirred into the mixture or into the pre-mixture.

The use of a catalyst for the hydrolysis of the compound of formula (I) for the formation of silicic acid is usually very helpful. Evanescent mineral acids, such as hydrochloric acid, e.g., in a relatively concentrated form (20 to 30 percent of weight HCl in a diluted solution) is preferred as a catalyst.

The compound of formula (I) and the hydrolysis catalyst can be distributed in the mixture or the silk screen paste (12); alternatively, a pre-mixture containing all components except for the aluminum particles can be produced and subsequently evenly mixed in with the aluminum particles (6). A certain hydrolysis of the compound of formula (I) in such a pre-mixture usually is not disadvantageous to the extent that the consistency (silk screen capacity) does not suffer as a result.

For the reasons mentioned above for the aluminum particle proportion, of primary relevance is not the quantity portion of the compound of formula (I) in the mixture (12) (FIG. 2) but rather the weight ration of the formed $SiO_2$ to the aluminum particle portion in the finished layer (9) (FIG. 1). The reduction in weight caused by the conversion of the compound of formula (I) to $SiO_2$ should also be considered.

Generally it is most purposeful to introduce such a quantity of weight of the compound of formula (I) into the mixture (12) or the pre-mixture proportionally which corresponds to about 100 to 300%, preferably about 200% of the weight proportion of the aluminum particles.

The proportion of the hydrolysis catalyst to the mixture (12) or to the pre-mixture generally depends upon the concentration of the compound of formula (I) in the mixture or pre-mixture and the desired hydrolysis conditions. An example is a catalyst proportion in the range of 1 to 25% of the weight of the compound of formula (I). Concentrated hydrochloric acid can, e.g., be used in proportions of 2 to 20% of the weight to $Si(OC_2H_5)_4$.

Preferably, the mixture (12) contains a dominating proportion, with respect to weight, of a so-called vehicle, i.e., the afore-mentioned temporary bonding agent which facilitates the basic mixing of the components (aluminum particles, compound of formula (I) and hydrolysis catalyst) and the layer-like application of the mixture (12) onto the plate (2). Common silk screen pastes, the components of which can be removed without residues by thermal means, are generally suitable as bonding agents. Such pastes are technically available and usually consist of a thermally relatively unstable organic polymer such as nitrocellulose which is dissolved or soaked in an organic solvent. Generally, the mixture (12) contains at least 50 percent of weight, preferably about 70 to 95 percent of weight, of temporary bonding agents.

Figure 2:
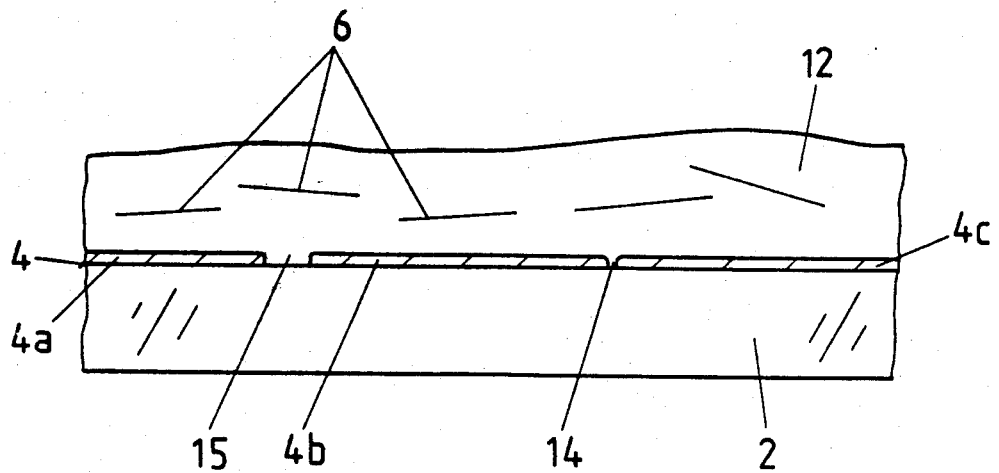
FIG. 2 is a schematic enlarged cross-sectional view of the state of the fresh layer applied for the formation of the interior reflector.

The mixture or paste (12) can be applied onto the plate (12) using the familiar procedure, e.g., by means of silk screen printing, as is depicted schematically in FIG. 2.

The thickness of the finished reflector layer (9) (FIG. 1) can be controlled by the thickness of the pressed on layer (12) and its level of aluminum particles or compound of formula (I). In order to produce reflector layers (9) in the preferred thickness area of 0.3 to 5 μm, preferably with a thickness of 0.5 to 2 μm, the thickness of the freshly pressed on layer (FIG. 2) should be about 3 to 50 μm if the mixture consists of about 90 percent of weight of temporary bonding agents and the remainder consists of Al particles, compound of formula (I) and the hydrolysis catalyst in the afore-mentioned relative proportions. Because the thicknesses of the pressure layer that can be achieved without problems with the silk screen usually are in the range of about 5 to 50 μm, the preferred usage of mixtures (12) with a level of 70 to 95 percent of weight in temporary bonders is clearly comprehensible.

The fresh layer (FIG. 2), preferably applied by silk screen pressure, can be pre-dried if so desired, e.g., at temperatures of 80° to 150° C. depending upon the type of the organic solvent in the temporary bonding agent in order to remove at least a portion of the solvent. The hydrolytic formation of silicic acid from the compound of formula (I) or the condensation of orthosilicic acid to form polysilicic acid can start prior to, during or after the application of the mixture (12) onto the plate and be concluded already prior to annealment.

The annealment of the pre-dried layer from the mixture (12) should cause a practically complete removal or residue-free decomposition of the temporary bonding agent, of the organic components resulting from the hydrolysis of the compound of formula (I) and of the water formed by dehydration of silicic acid.

For this, temperatures of 300° to 550° C., preferably 400° to 500° C. and especially 430° to 470° C., are generally suitable. Higher temperatures are not purposeful due to the properties of the materials involved (melting point of aluminum, softening of the material of the plates, etc.) whereas temperatures below 300° C. do not guarantee the complete removal of the organic components or of the dehydration water. The best duration of the annealment depends upon the temperature. Typical values are between 5 and 60 minutes. In the case of the preferred annealment temperatures, times of 10 to 30 minutes are typical.

Below, a few examples are provided for reference of parts and percent to the weight.

EXAMPLE 1

(A) Initially a silk screen paste is produced as a temporary bonding agent made of 8 parts of amyl acetate and 1 part of nitrocellulose.

(B) 100 parts of the bonding agent in accordance with (A) are mixed with 2 parts of concentrated diluted HCl solution (38%, density of 1.19, chemically pure) and with 10 parts of tetraethyl silicate ($Si(OC_2H_5)_4$) evenly.

(C) The paste obtained thereby is mixed evenly with 5 parts of aluminum particles (technical product "952-Al flake powder" of the U.S. firm Bronze Powders Inc., Flemington, N.J.) by means of intensive stirring and was previously pushed through a screen for a maximum particle size of less than or equal to 10 μm. The thickness of the flakes are about 0.1 μm.

(D) The paste according to (C) is pressed onto common LC-cell plates (2) made of glass (FIG. 2) bearing segmented electrode surfaces made of indium oxide/-zinc oxide (4a, 4b, 4c) with thickness of around 300 nm in a silk screen thickness of about 8 μm (thick layer) by using polyester textures (trademark name of "Estal Mono 90M" of the Swiss silk gauze factory, Thal SG) as a pressure sieve in a technical silk screen system so that practically the entire display active areas of the plates are covered with the pressure layer. Then the plates coated with the pressure layer are dried for 5 minutes at 160° C. Thereby, practcally the entire amyl acetate is removed and there remains a practically solid, adhesive layer.

(E) the plates obtained in accordance with paragraph (D) are annealed in an oven at 480° C. for 5 minutes and then left to cool. The plates are now outfitted with a 0.8 1 m thick reflector layer (9, FIG. 1) which almost totally reflects or scatters any incident light. Throughout, all aluminum particles (6) are approximately parallel to the surface of the plate (2) and are imbedded in a visually homogeneous and transparent (glass-like clear) matrix which consists almost completely of $SiO_2$. The reflector layer (9) adheres rigidly to the plate (2) and is wipe resistant: practically no aluminum particles can be ascertained on a paper fleece strip that was rubbed across the coating (9) under a great deal of hand pressure (about 50 kilopascal). The layer (9) can also be rubbed in the familiar fashion for parallel orientation. A silane layer (8, FIG. 1) which is placed upon the surface of the coating (9) for vertical orientation can be distributed easily and well and indicates very good adhesion. The aluminum particles (6) are very well isolated from each other in the directions parallel to the surface of the plate (2); the corresponding electrical resistance value (layer resistance) is at least 10 MΩ per square.

(F) "Guest/Host" display cells are produced by assembling them with the corresponding front plate (1, FIG. 1) from the plates obtained in this way in accordance with the methodology described in DE-OS 26 39 675 and 27 16 609. The connection on the edges of the plate (1 and 2) is achieved by pressing on a small rod made of glass solder on the front or the rear plate and heating up the two plates. If the reflector layer (9) is coated with a silane layer (8) for the vertical orientation of the LC-molecules in the border coating of the FC-mass (5), then the LC-cells (10) obtained thereby already indicate complete display contrast at operating voltages of under 10 volts. Even in the narrow (<50 μm) separation zones (14) of the electrode layer (4), no short circuit effects were ascertained at the operating voltage of the cells (10). If one uses a commercially available silk screen bonding agent (for the thick film technique) instead of the mixture described in paragraph (A), then similar results are achieved.

EXAMPLE 2 (COMPARISON)

Just as in example one, the process is the same except for omitting the steps described in paragraph (B), i.e., the silk screen mass (A) is mixed directly with the aluminum particles (C).

The reflector layers obtained in this fashion after annealment in accordance with paragraph (E) prove to be unstable in the wipe test, i.e., considerable portions of aluminum pigment can be recognized on the paper fleece strip used for the test. When wiped a number of times and, in any event, when rubbed for parallel orientation, the reflector layer is largely removed. Attempts to apply vertical orientation material (silane) result in very uneven and therefore unuseable layers; operating voltages of more than 10 volts, e.g., around 12 volts, are required for operating the "Guest/Host" cells formed by such plates for complete display contrast.

The layer resistance value of the reflector layer obtained in the comparative experiment is below 10 MΩ per square and is only about 7 MΩ per square.

EXAMPLE 3 (COMPARISON)

The process is the same as in example 2 with the change that the silk screen pressure paste in step (C) has and additive of 2.5% glass solder powder (granular size of 0.5 to 5 μm) to the aluminum particles.

The reflector layers obtained in this way indicate a somewhat better wipe resistance than those of example 2 but practically cannot be rubbed and are comparatively more difficult (example 1) to coat with silane. The layer resistance is below 10 MΩ per square; the bonding phase proves to be visually inhomogeneous and the aluminum particles are not imbedded in the bonding phase but rather only regionally adhesive.

EXAMPLE 4

The process is the same as in example 1 except for the following changes in the steps described in paragraphs (B) and (C):

(B) the tetraethyl silicate (10 parts) is dissolved in 20 parts of isopropanol. The solution is then stirred with 0.2 parts of concentrated diluted HCl solution (38%). In this way the tetraethyl silicate is hydrolysized to form silicic acid which then neither precipitates nor leads to an inconvenient viscosity increase.

(C) the solution is evenly mixed, by means of intensive stirring, with the temporary bonding agents of paragraph (A), example 1, or with a commercially available silk screen bonding agent (for the thick film technique) and with 5 parts of the aluminum particles described in paragraph (C), example 1.

Essentially the same results are achieved with the same processes as described in paragraphs (D), (E) and (F) of example 1.

EXAMPLE 5

The process is the same as in example 1 but with the change that a semi-transparent reflector layer (9) is obtained by reducing the proportion of aluminum particles in paragraph (C) on the plate (2).

An LC-cell (10) produced in this way can, e.g., be operated in transmission with the aid of a microlamp situated behind the cell plate (2) without surrounding light.

I claim:

1. A process for the manufacturing of a liquid crystal display cell, comprising:
   coating two cell plates on the interior surface with electrodes;
   coating at least partially onto the electrodes of the second cell plate with a mixture comprising flake-like aluminum particles and at least a fluid organic orthosilicate (at normal temperature) with the formula

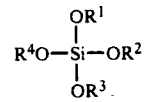

wherein $R^1$, $R^2$, $R^3$ and $R^4$ are similar or different single value organic radicals, of which the corresponding hydroxyl compounds are volatile, whereby the mixture is hydrolyzed to form silicic acid prior to, during or after the coating;
heating the second cell plate at temperatures from 300° C. to 550° C., and so annealing a reflective layer consisting of flake-like aluminum particles embedded in a practically homogeneous, transparent layered matrix mainly comprising $SiO_2$; and
assembling the two cell plates as a cell.

2. A process according to claim 1, wherein the radicals $R^1$, $R^2$, $R^3$ and $R^4$ are alkyl groups with one to four C-atoms.

3. A process according to claim 2, wherein the radicals $R^1$, $R^2$, $R^3$ and $R^4$ are equal ethyl-groups.

4. A process according to claim 1 wherein the hydrolysis occurs in an acid atmosphere.

5. A process according to claim 4, wherein the acid comprises a volatile mineral acid, such as hydrochloric acid.

6. A process according to claim 5, wherein the volatile mineral acid comprises hydrochloric acid.

7. A process according to claim 1, wherein the mixture contains an organic solvent as well as a thermally decomposing organic thickener, which is dissolved in the solvent, as a temporary bonding agent.

8. A process according to claim 1 wherein the mixture has a paste-like consistency and is coated by screen printing at least partially onto the electrodes of the second cell plate.

9. A process according to claim 1 wherein the coating is dried prior to heating at temperatures from 80° C. to 150° C.

* * * * *